(12) United States Patent
Kunimatsu (10) Patent No.: US 12,145,355 B2
(45) Date of Patent: Nov. 19, 2024

(54) NON-TRANSITORY COMPUTER-READABLE MEDIUM AND CONTROL METHOD

(71) Applicant: BROTHER KOGYO KABUSHIKI KAISHA, Nagoya (JP)

(72) Inventor: Akihiro Kunimatsu, Okazaki (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 205 days.

(21) Appl. No.: 18/058,710

(22) Filed: Nov. 23, 2022

(65) Prior Publication Data

US 2023/0166535 A1 Jun. 1, 2023

(30) Foreign Application Priority Data

Nov. 30, 2021 (JP) .................. 2021-193840

(51) Int. Cl.
*B41J 11/00* (2006.01)
*B41J 3/407* (2006.01)
*H04N 1/00* (2006.01)

(52) U.S. Cl.
CPC ........... *B41J 11/009* (2013.01); *B41J 3/4075* (2013.01); *H04N 1/00209* (2013.01)

(58) Field of Classification Search
CPC .... B41J 11/009; B41J 3/4075; H04N 1/00209
See application file for complete search history.

(56) References Cited

U.S. PATENT DOCUMENTS

2015/0251469 A1* 9/2015 Kasuga .................. B41J 11/46
                                                             347/110
2019/0079715 A1* 3/2019 Kiyose .................. G06F 3/1252

FOREIGN PATENT DOCUMENTS

| JP | 2009-176126 A | | 8/2009 |
| JP | 2021026267 A | * | 2/2021 |
| JP | 6977574 B2 | * | 12/2021 |

* cited by examiner

*Primary Examiner* — Sharon Polk
(74) *Attorney, Agent, or Firm* — KENEALY VAIDYA LLP (57) ABSTRACT

A non-transitory computer-readable medium storing program set including a first program and a second program readable by a computer of an information processing device, the first program causing the information process device to register paper pre-set data to a paper information table in which a first correction value for correcting image data and paper information are associated, and the second program causing the information process device to: generate a list by referring to in the paper information table; send the generated list to an application program; obtain the first correction value corresponding to the paper pre-set data set in print setting from the paper information table; correct the received image data by using the obtained first correction value; and transmit a printing command for performing printing based on the corrected image data to a printer.

19 Claims, 8 Drawing Sheets

| PAPER NAME | TYPE OF PAPER | LABEL WIDTH | LABEL LENGTH | | CORRECTION NAME |
|---|---|---|---|---|---|
| PAPER A | ROLL PAPER/DIE-CUT LABEL | 24mm | 40mm | | CORRECTION A |
| PAPER B | ROLL PAPER/MARK LABEL | 24mm | 40mm | | CORRECTION B |
| PAPER C | FANFOLD PAPER/MARK LABEL | 32mm | 20mm | | CORRECTION C |
| PAPER D | ROLL PAPER/UNFIXED LENGTH LABEL | 32mm | 20mm | | CORRECTION D |

| CORRECTION NAME | CONVEYANCE ADJUSTMENT AMOUNT | DOT CUTTING AMOUNT | PRINTING GUARANTEE SPEED | PRINTING DENSITY |
|---|---|---|---|---|
| CORRECTION A | 0 | 3 | 400mm/s | 4 |
| CORRECTION B | +2 | 1 | 600mm/s | 3 |

| PRINT SETTING TOOL | | | |
|---|---|---|---|
| CURRENTLY REGISTERED PAPER PRE-SET | | | |
| PAPER NAME ▼ | TYPE OF PAPER | LABEL WIDTH | LABEL CORRECTION NAME |
| PAPER A | ROLL PAPER/ DIE-CUT LABEL | 24mm | 40mm | CORRECTION A |
| PAPER B | ROLL PAPER /MARK LABEL | 24mm | 40mm | CORRECTION B |
| PAPER C | FANFOLD PAPER /MARK LABEL | 32mm | 20mm | CORRECTION C |
| PAPER D | ROLL PAPER/UNFIXED LENGTH LABEL | 32mm | 20mm | CORRECTION D |

- 240
- 241
- 242 NEW
- 243 EDIT
- 244 DELETE
- 245 END

*FIG. 6B*

PAPER SETTING — 250

- PAPER NAME: NEW PAPER — 251
- TYPE OF PAPER: ROLL PAPER/DIE-CUT LABEL ▼ — 252
- WIDTH: 24.0 mm [19.0–118.0]
- HEIGHT: 40.0 mm [6.4–1000.0]
- DISTANCE BETWEEN LABELS: 6.0 mm
- 253
- RIGHT MARGIN: 3.0 mm
- LEFT MARGIN: 3.0 mm
- TOP MARGIN: 3.0 mm
- BOTTOM MARGIN: 3.0 mm
- 254
- CORRECTION NAME: CORRECTION A ▼ — 255A
- NEW — 255B
- EDIT — 255C
- DELETE — 255D
- 255
- OK — 258
- CANCEL — 259

NON-TRANSITORY COMPUTER-READABLE MEDIUM AND CONTROL METHOD

REFERENCE TO RELATED APPLICATIONS

This application claims priority from Japanese Patent Application No. 2021-193840 filed on Nov. 30, 2021. The entire content of the priority application is incorporated herein by reference.

BACKGROUND ART

Known is a technique of storing a correction value in advance, correcting image data according to the correction value when the image data is sent to a printer, and printing an image based on the corrected image data on the printer. For example, a related art discloses a configuration in which an information process device causes an inkjet printer to print a test pattern, causes a scanner to read the printed matter, and generates a correction table based on a read result.

DESCRIPTION

The printer can perform printing on various types of paper with different characteristics such as paper quality, and there may be different results in printed matters, for example, different degrees of smudge of coloring materials depending on characteristics. Therefore, in order to appropriately correct the difference based on characteristics of paper, it is required to reset the correction value when a parameter relating to the characteristics of paper in a print setting is changed. The procedure for resetting the correction value based on the change of the parameter relating to the characteristics of the paper is a labor for a user.

One illustrative aspect of the present disclosure provides a non-transitory computer-readable medium storing program set including a first program and a second program readable by a computer of an information processing device The first program, when executed by the computer, causes the information process device to perform: registering paper pre-set data to a paper information table stored in the information process device, a first correction value that is used for correcting image data and paper information showing characteristics of paper being associated with each other in the paper information table, a plurality of items of the paper pre-set data being registerable to the paper information table. The second program, when executed by the computer, causes the information process device to perform: generating a list showing the paper pre-set data registered in the paper information table; based on receiving a request from an application program installed in the information process device, sending the generated list to the application program, the application program being configured to set one item of the paper pre-set data included in the list as a paper parameter relating to paper among parameters included in print setting; based on receiving, from the application program, image data and the print setting in which one item of the paper pre-set data included in the list is set as the paper parameter, obtaining the first correction value corresponding to the paper pre-set data set in the received print setting from the paper information table; correcting the received image data received from the application program by using the obtained first correction value; and transmitting a printing command to a printer via a communication interface of the information process device, the printing command being for performing printing based on the corrected image data.

In the program set described in the present disclosure, the paper pre-set data in which a first correction value and the paper information are associated with each other is prepared in advance by the first program and is registered in the paper information table. The list showing the paper pre-set data prepared in advance is sent to the application program by the second program. Thus, the application program can select paper pre-set data. When a print setting in which one item of paper pre-set data is set is received from the application program, the second program refers to the paper information table obtains the first correction value from the set paper pre-set data. When the user sets one item of the paper pre-set data via the application program, the first correction value is also obtained along with the setting. Therefore, when the parameter relating to the paper is changed, a labor of changing the first correction value can be reduced.

A control method and a computer program for embodying functions of the device, and a non-transitory computer-readable medium that stores the corresponding computer program are new and useful.

According to a technique described in the present disclosure, a program set that is used for controlling the printer and that reduces a labor of a user when a parameter relating to the characteristics of the paper is changed is embodied.

Hereinafter, the illustrative embodiment in which the program is embodied is described in detail with reference to the accompanying drawings. The present illustrative embodiment describes a program executed by a personal computer (hereinafter referred to as a "PC") that is connectable to a printer having a printing function.

{Configuration of Printing System}

Figure 1:
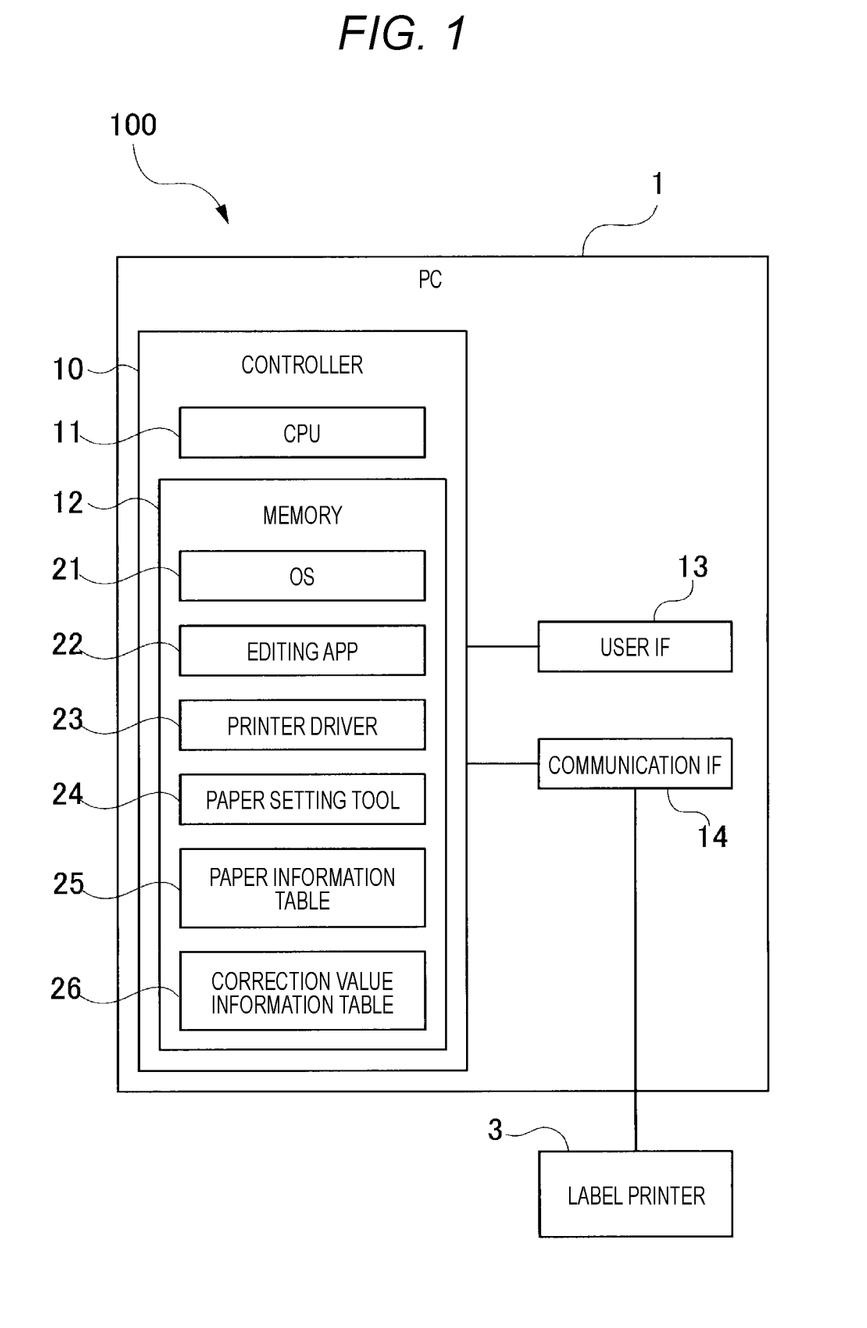
FIG. 1 is a diagram schematically showing a configuration of a printing system according to an illustrative embodiment.

As shown in FIG. 1, a printing system 100 according to the present illustrative embodiment includes a PC 1 and a label printer 3. The numbers of the PCs 1 and the label printers 3 that configure a printing system is not limited to one and may be multiple.

The PC 1 of the printing system 100 includes a controller 10 including a CPU 11 and a memory 12. "CPU" is an abbreviation for "central processing unit." The PC 1 is an example of an information process device, and the CPU 11 is an example of a computer. The PC 1 includes a user interface (hereinafter, referred to as a "user IF") 13, a communication interface (hereinafter, referred to as a "communication IF") 14, and these are electrically connected to the controller 10. The controller 10 in FIG. 1 is a general term for collectively describing hardware and software used for controlling the PC 1, and does not necessarily represent single hardware that actually exists in the PC 1.

The CPU 11 performs various processes according to a program read from the memory 12 or based on an operation of a user. Various programs or various items of data are stored in the memory 12. The memory 12 is also used as a working area when the various processes are performed. A buffer included in the CPU 11 is also an example of a memory. An example of the memory 12 is not limited to a ROM (which is an abbreviation for "read only memory"), RAM (which is an abbreviation for "random access memory"), an HDD (which is an abbreviation for "hard disk drive"), and the like built in the PC 1. The memory 12 may be a storage medium from which the CPU 11 can read data or to which the CPU 11 can write data, for example, a storage medium such as a CD-ROM or a DVD-ROM.

The user IF 13 includes hardware on which a screen for informing information to a user is displayed and hardware that receives an operation by a user. The user IF 13 may be a combination of a display on which information can be displayed and a mouse, a keyboard, or the like that has an input receiving function. The user IF 13 may be a touch panel including a display function and an input receiving function.

The communication IF 14 includes hardware for performing communication with an external device such as the label printer 3. The communication standard of the communication IF 14 is Ethernet (registered trademark), Wi-Fi (registered trademark), USB, and the like. The PC 1 may include the plurality of communication IFs 14 corresponding to a plurality of communication standards.

An operating system (hereinafter, referred to as an "OS") 21, an editing application program (hereinafter, referred to as an "editing app") 22, a printer driver 23, a paper setting tool 24, a paper information table 25, and a correction value information table 26 are stored in the memory 12 of the PC 1. The paper setting tool 24 is an example of a first program. The printer driver 23 is an example of a second program. The editing app 22 is an example of an application program installed in the information process device. The OS 21 is, for example, Windows (registered trademark of Microsoft Corporation), Mac OS (registered trademark of Apple Inc.), Linux (registered trademark of Linus Torvalds), iOS (registered trademark of Apple Inc.), and Android (registered trademark of Google LLC).

The editing app 22 is a program for receiving generation and editing of at least an image to be printed and a printing instruction for the image. The editing app 22 may additionally receive an instruction of save of an image or the like. The editing app 22 may be, for example, Word or PowerPoint manufactured by Microsoft (registered trademark), or may be an app provided by a vendor of the label printer 3. The editing app 22 according to the present illustrative embodiment has a function of generating, editing, and storing an image to be printed on a label. Details of the editing app 22 are described below.

The printer driver 23 is a program corresponding to the label printer 3, and is a program that performs communication with the label printer 3 and controls the label printer 3. The printer driver 23 has a function of receiving a print setting or image data, a function of generating print data based on the image data, and a function of outputting the print data to a printer. The printer driver 23 is activated, for example, when a printing instruction or a display instruction of a screen for a print setting is received from the editing app 22.

The paper setting tool 24 is a program for generating paper pre-set data configured with a plurality of parameters and correction value pre-set data configured with a plurality of correction values. The paper setting tool 24 has a deleting function and an editing function on the existing paper pre-set data and existing correction value pre-set data. Details of the paper setting tool 24 are described below.

Figure 2:
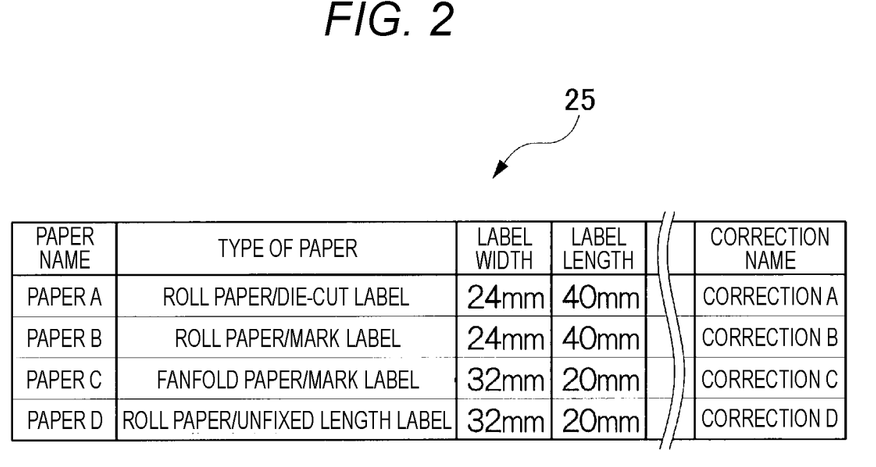
FIG. 2 is a diagram showing a configuration of a paper information table.

The paper information table 25 is a table that stores paper pre-set data. A plurality of items of paper pre-set data can be registered in the paper information table 25. As shown in FIG. 2, paper names for identifying individual items of the paper pre-set data, the plurality of parameters, and correction names each indicating one item of the correction value pre-set data are associated with the paper pre-set data according to the present illustrative embodiment. The plurality of parameters that configure the paper pre-set data are information indicating the characteristics of the paper, and are, for example, a type of paper, the size of paper (the width and height of a label), an interval of the label, and a margin. Other parameters may be included in the paper pre-set data. The parameter that configures the paper pre-set data is an example of the paper information.

Figure 3:
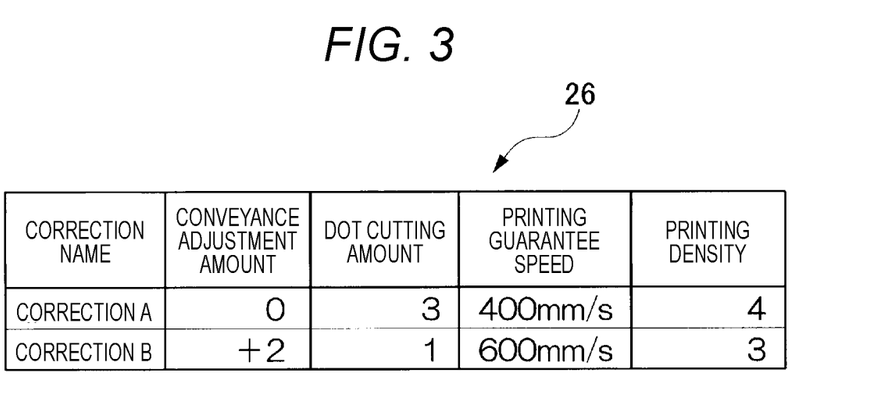
FIG. 3 is a diagram showing a configuration of a correction value information table.

The correction value information table 26 is a table for storing the correction value pre-set data. The plurality of items of correction value pre-set data can be registered in the correction value information table 26. As shown in FIG. 3, correction names for identifying respective items of correction value pre-set data and the plurality of correction values are associated with the correction value pre-set data according to the present illustrative embodiment. The correction value that configures the correction value pre-set data is a correction value used when the image is printed and is, for example, a dot cutting amount for ink smudge correction, a conveyance adjustment amount for conveyance error correction, a print guarantee speed, or a print density. Correction values other than these such as brightness, contrast, and color balance may be included in the correction value pre-set data. The correction values that configure the correction value pre-set data are examples of a first correction value and a second correction value.

According to the present illustrative embodiment, as shown in FIG. 2, a correction name is included in the paper pre-set data. The correction name corresponds to the correction name included in the correction value pre-set data shown in FIG. 3. Therefore, in the paper pre-set data, the plurality of parameters showing the characteristics of the paper and the plurality of correction values that configure the correction value pre-set data are associated with each other.

The label printer 3 that configures the printing system 100 at least has a printing function and a communication function, can contain roll paper, and can print the image based on received print data on the roll paper. The roll paper refers to a printing medium in a state in which labels are wound in a superposed manner on continuous strip-shaped release paper. The labels of the roll paper may be a continuous long tape or may be a die-cut label that is cut into a predetermined shape in advance. The printing method of the label printer 3 according to the present illustrative embodiment is an inkjet method, but may be other printing methods such as a thermal transfer method and an electrophotographic method. The label printer 3 is an example of a printer.

The label printer 3 concurrently performs printing on the labels and conveys the roll paper. Hereinafter, the size of the printing medium is simply referred to as "paper size". In addition, among the paper sizes, the size of the paper in the conveyance direction in the label printer 3 is referred to as a "height", and the size of the paper in the direction orthogonal to the conveyance direction in the label printer 3 is referred to as a "width".

The label printer 3 also supports color printing, and can be equipped with ink cartridges for four colors, cyan (C), magenta (M), yellow (Y), and black (K). The label printer 3 may not support color printing and may be dedicated to monochrome printing.

{Details of Editing App}

Figure 4:
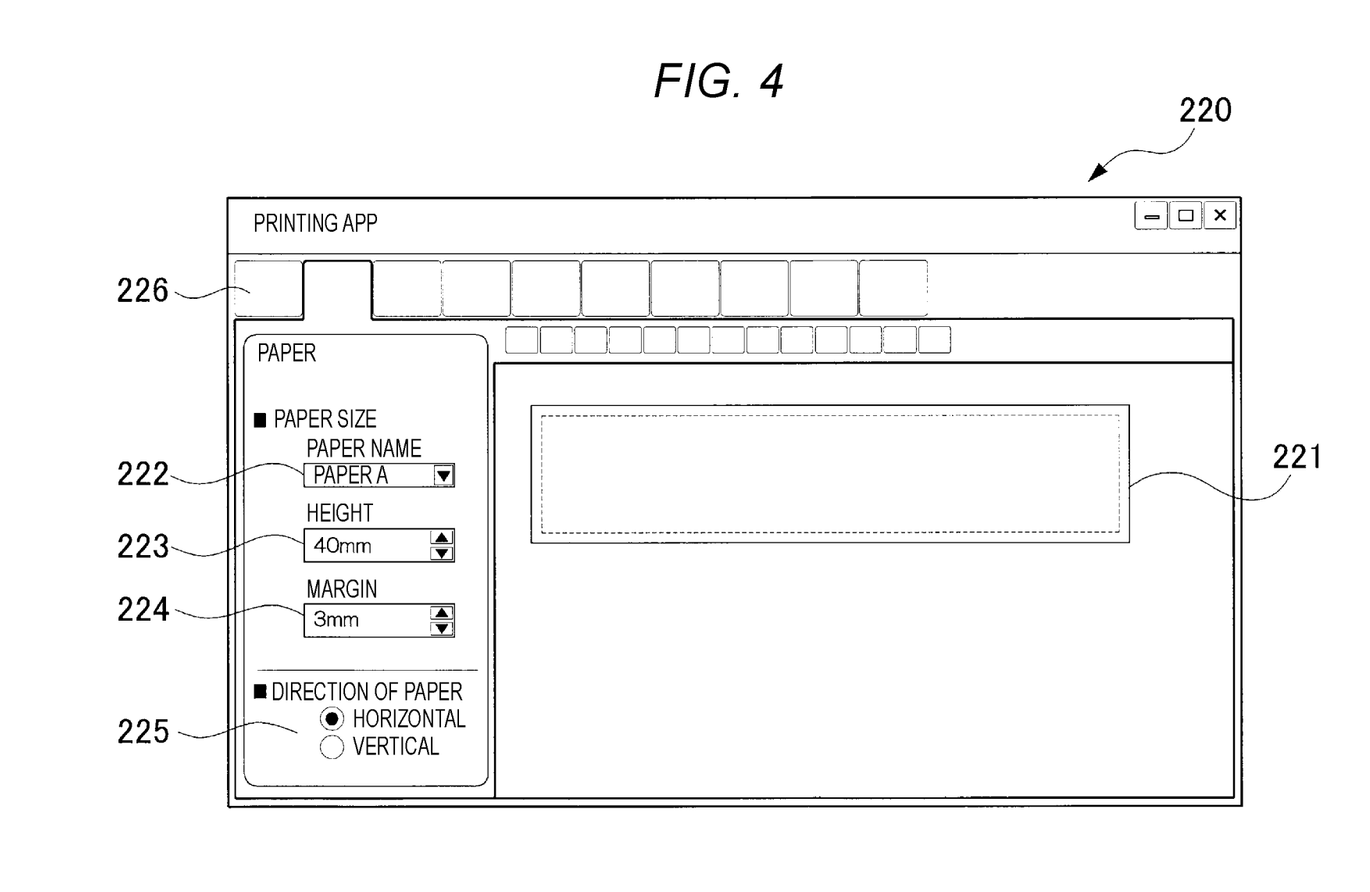
FIG. 4 is a diagram showing a configuration of a main screen by an editing app.

Next, details of the editing app 22 are described. The editing app 22 according to the present illustrative embodiment has a function of providing a main screen 220 as shown in FIG. 4 and causing the main screen 220 to be displayed on the user IF 13, for example, based on the activation of the editing app 22.

An editing area 221 for receiving the editing of the image to be printed on the label, a paper name selection list 222 that is a list box for selecting a paper name, a height setting area 223 for setting the height of a label, a margin setting area 224 for setting a margin, an orientation setting area 225 for setting the orientation of paper, and a toolbox 226 for listing shortcut icons corresponding to various functions including printing and storing are included in the main screen 220. In addition, items displayed on the main screen 220 are not limited to these and may further include other items.

In the main screen 220, the image of the label being edited is displayed in the editing area 221. When the setting contents such as the paper name selection list 222 or the height setting area 223 are changed, the image of the label displayed in the editing area 221 is changed.

In the main screen 220, paper names included in each item of the paper pre-set data registered in the paper information table 25 as settable paper names are listed and displayed in the paper name selection list 222. That is, the paper names of the paper pre-set data registered in the paper information table 25 in advance are displayed in a selectable manner, in the paper name selection list 222.

Figure 5:
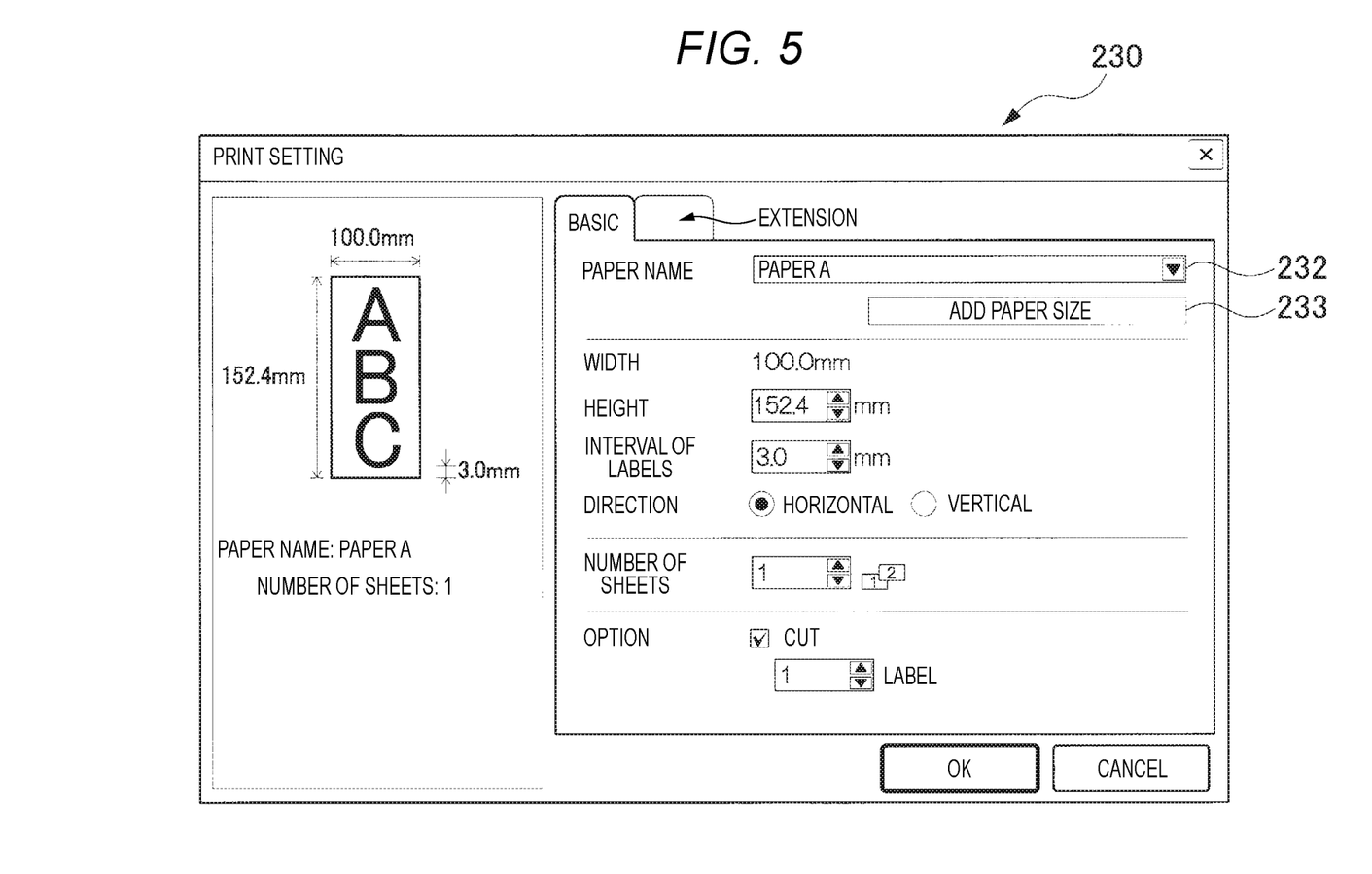
FIG. 5 is a diagram showing a configuration of a print setting screen by a printer driver.

The printer driver 23 according to the present illustrative embodiment has a function of providing a print setting screen 230 as shown in FIG. 5. The editing app 22 can activate the print setting screen 230 of the printer driver 23 according to the operation of the user. A paper size selection list 232 that is a list box for selecting a paper size is included in the print setting screen 230, and paper names of each item of the paper pre-set data which are registered in the paper information table 25 as settable paper sizes are listed and displayed in the paper size selection list 232. An "add paper size" button 233 that is a button for adding an option of the paper size is included in the print setting screen 230, and thus when the "add paper size" button 233 is operated, the printer driver 23 activates the paper setting tool 24 that can additionally register the paper pre-set data.

{Details of Paper Setting Tool}

Next, details of the paper setting tool 24 are described. The paper setting tool 24 according to the present illustrative embodiment has a function of providing various screens and displaying a basic screen 240 shown in FIG. 6A on the user IF 13, for example, based on the activation of the paper setting tool 24.

Figure 6A:
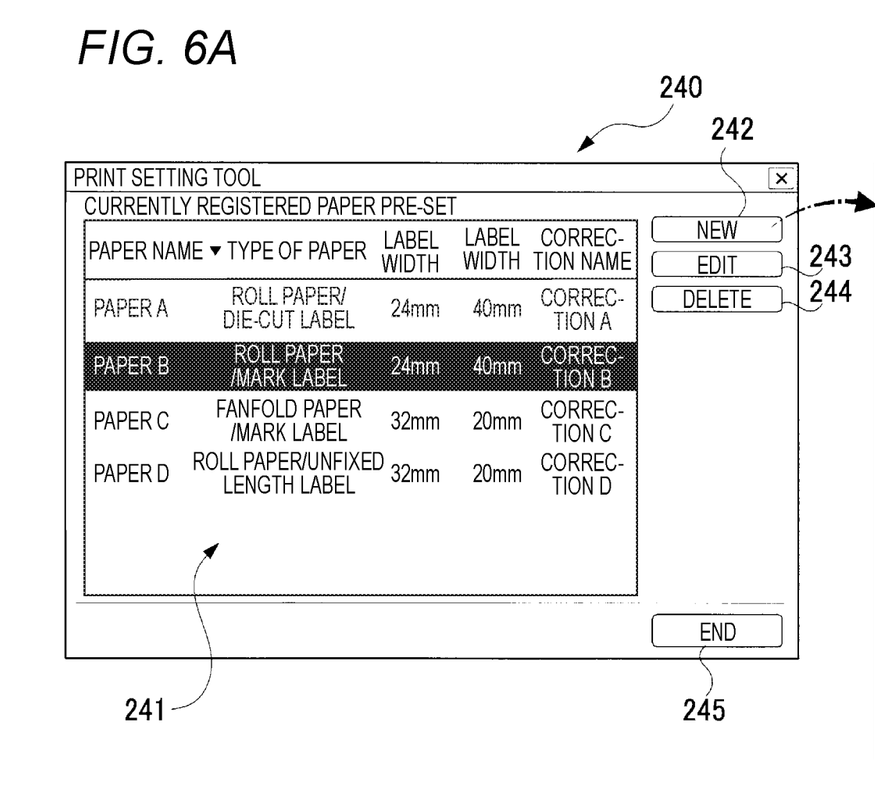
FIGS. 6A and 6B are diagrams showing a screen transition when a new paper preset is registered by a paper setting tool.

A list area 241 for displaying the list of the paper pre-set data registered in the paper information table 25, a new button 242 for instructing generation of new paper pre-set data, an edit button 243 for instructing editing of the selected paper pre-set data, a delete button 244 for instructing deletion of the selected paper pre-set data, and an end button 245 for ending the paper setting tool 24 are included in the basic screen 240. The items displayed on the basic screen 240 are not limited to these and may further include other items.

In the basic screen 240, the setting contents of individual items of paper pre-set data registered in the paper information table 25, that is, the paper names, various parameters showing the characteristics of the paper, and correction names for specifying the correction value pre-set data are displayed in the list area 241. In the list area 241, paper pre-set data that is selected by receiving the selection of any one of the plurality of items of the paper pre-set data registered in the paper information table 25 is displayed to be distinguished from unselected paper pre-set data.

Figure 6B:
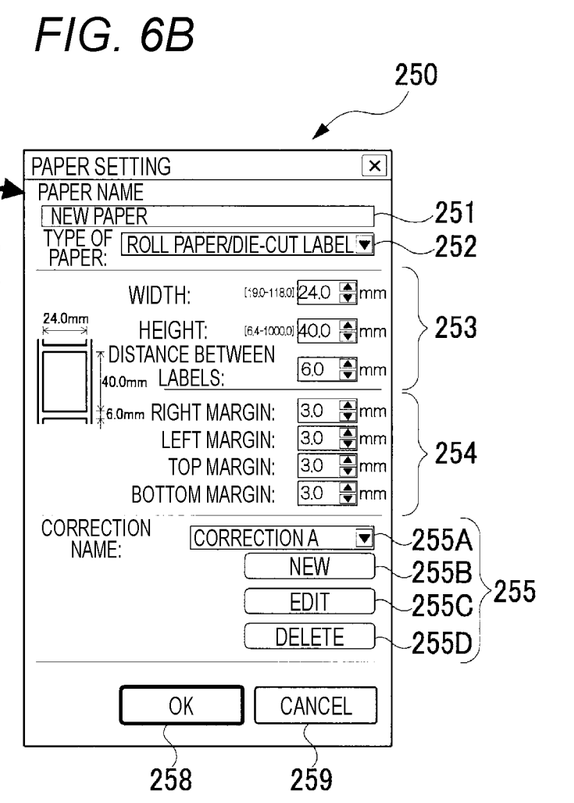

When the new button 242 is operated in the basic screen 240, the paper setting tool 24 displays a paper setting screen 250 as shown in FIG. 6B on the user IF 13. For each item that can be set settable in the paper setting screen 250, a default value is displayed. When the edit button 243 is operated, the paper setting screen 250 is displayed on the user IF 13. In this case, the setting content of paper pre-set data selected in the list area 241 is reflected in each item that can be set in the paper setting screen 250. When the delete button 244 is operated, the paper pre-set data selected in the list area 241 is deleted from the list area 241 and also from the paper information table 25.

A paper name field 251, a paper type selection list 252 that is a list box for selecting the type of the paper, a size setting area 253 for setting the size of the label, a margin setting area 254 for setting a margin, a correction value setting area 255 for setting a correction value, an OK button 258, and a cancel button 259 are included in the paper setting screen 250. In addition, the items displayed in the paper setting screen 250 are not limited to these and may further include other items.

In the paper setting screen 250, a paper name is inputted to the paper name field 251. According to the present illustrative embodiment, the size or margin of the label is set as the information showing the characteristics of the paper, and thus a name that enables the type or use of the label to be distinguished may be input to the paper name.

In the paper setting screen 250, types of paper incorporated into the paper setting tool 24 are listed and displayed as types of settable paper, in the paper type selection list 252. That is, the types of the paper that can support the label printer 3 are incorporated into the paper setting tool in advance and are displayed in the paper type selection list 252 in a selectable manner. In addition, the types of the paper are incorporated into the paper setting tool 24 in combination with the paper quality and the form of the label. For example, when the label printer 3 supports the roll paper and fanfold paper as the paper quality and supports a die-cut label, a mark label, and an unfixed length label as the form of the label, a plurality of types of options such as "roll paper/a die-cut label", "roll paper/a mark label", "roll paper/an unfixed length label", "fanfold paper/a die-cut label", "fanfold paper/a mark label", and "fanfold paper/an unfixed length label" can be selected as types of the paper.

In the paper setting screen 250, as the characteristics of the label, the width and height of the label are displayed in the size setting area 253 and can be set via the user IF 13. In the size setting area 253, as the characteristics when printing is performed on the label, an interval of the labels is displayed and can be set via the user IF 13. In the margin setting area 254, top, bottom, left, and right margins of the label are displayed and can be set via the user IF 13.

In the paper setting screen 250, a correction name selection list 255A that is a list box for selecting a correction name, a new button 255B for instructing generation of new correction value pre-set data, an edit button 255C for instructing editing of the correction value pre-set data selected from the correction name selection list 255A, and a delete button 255D for instructing the deletion of the correction value pre-set data selected from the correction name selection list 255A are included in the correction value setting area 255.

Correction names included in each item of correction value pre-set data registered in the correction value information table 26 are listed and displayed in the correction name selection list 255A as selectable correction names. That is, in the correction name selection list 255A, correction value pre-set data registered in the correction value information table 26 in advance is displayed in a selectable manner.

Figure 7A:
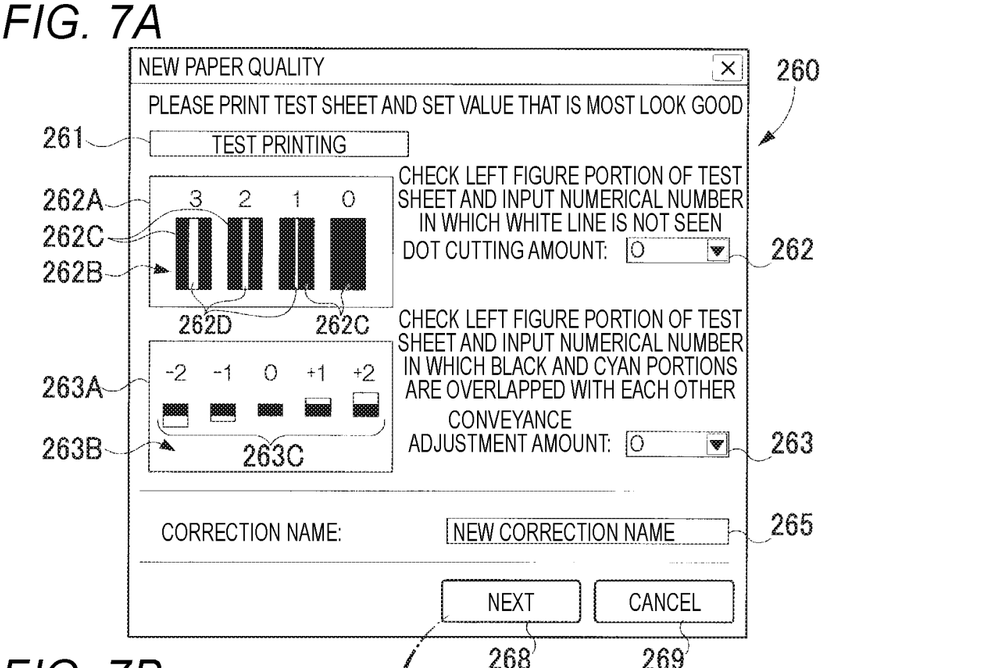
FIGS. 7A and 7B are diagrams showing a screen transition when a new correct preset is registered by a paper setting tool.

When the new button 255B is operated in the paper setting screen 250, the paper setting tool 24 displays a correction value setting screen 260 as shown in FIG. 7A on the user IF 13. A default value is displayed in each item that can be set in the correction value setting screen 260. When the edit button 255C is operated, the correction value setting screen 260 is displayed on the user IF 13. In this case, setting contents of the correction value pre-set data selected from the correction name selection list 255A is displayed in each item that can be set in the correction value setting screen 260.

In the paper setting screen 250, when the delete button 255D is operated, the paper setting tool 24 deletes the correction value pre-set data selected from the correction name selection list 255A, from the correction name selection list 255A and also from the correction value information table 26.

In the paper setting screen 250, when the OK button 258 is operated, if the paper setting tool 24 displays the paper setting screen 250 operated by the new button 242, the paper pre-set data of the set content is newly generated, the generated paper pre-set data is registered to the paper information table 25, and the paper setting screen 250 is closed. When the paper setting screen 250 operated by the edit button 243 is displayed, in the paper pre-set data registered to the paper information table 25, the selected paper pre-set data is updated to the set content, and the paper setting screen 250 is closed. Meanwhile, when the cancel button 259 is operated, the paper setting tool 24 closes the paper setting screen 250 without generating or updating the paper pre-set data.

A test print button 261 for receiving the printing instruction of the test pattern, an ink smudge correction value selection list 262 that is a list box for selecting the correction value of the ink smudge correction, a conveyance error correction value selection list 263 that is a list box for selecting the correction value of the conveyance error correction, a correction name field 265, a next button 268, and a cancel button 269 are included in the correction value setting screen 260 shown in FIG. 7A. In addition, a test pattern image area 262A showing the image of the test pattern of the ink smudge correction and a test pattern image area 263A showing the image of the test pattern of the conveyance error correction are included in the correction value setting screen 260. The items displayed in the correction value setting screen 260 are not limited to these and may further include other items.

In the correction value setting screen 260, when the test print button 261 is operated, the paper setting tool 24 instructs the label printer 3 to print the test pattern for correction value input. As the test pattern printed based on the operation to the test print button 261, there are two types of a test pattern: a test pattern for ink smudge correction and a test pattern for conveyance error correction, and each test pattern is printed once in the label printer 3 by one time of the operation to the test print button 261. The label printer 3 according to the present illustrative embodiment prints one type of the test pattern on one label. That is, according to the present illustrative embodiment, since two types of the test patterns are printed based on the operation to the test print button 261, two sheets of labels are used. Incidentally, the printing instruction of the test pattern may be directly transmitted from the paper setting tool 24 to the label printer 3, or may be transmitted from the paper setting tool 24 to the label printer 3 via the printer driver 23. The number of types of test patterns to be printed is not limited to two, and three or more types of test patterns may be printed.

The ink smudge correction is correction for reducing the influence of smudge of a coloring material represented by ink. When smudge occurs, for example, in case of printing an image of a barcode, widths of black bars increase, and thus correct information may not be recorded. Also, in case of printing texts, characters may become indistinct due to the thickening of the characters. In addition, with respect to the smudge of this coloring material, a degree of smudge differs depending on the paper quality. Also, in the ink smudge correction, the setting of the dot cutting amount is received as the correction value, and a process of cutting contours of lines or characters included in the image, that is, a process of converting the color of pixels positioned in the contours thereof into a background color or a white color by an amount corresponding to the set dot cutting amount, is performed. According to this correction, for example, widths of these lines are reduced by the amount corresponding to the set dot cutting amount, and thus the lines become narrower than those before the correction.

Figure 8A:
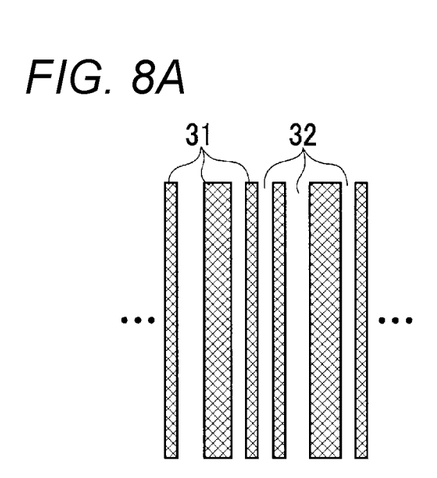
FIGS. 8A to 8D are diagrams showing an example of a change of an image of a barcode by ink smudge correction.
Figure 8B:
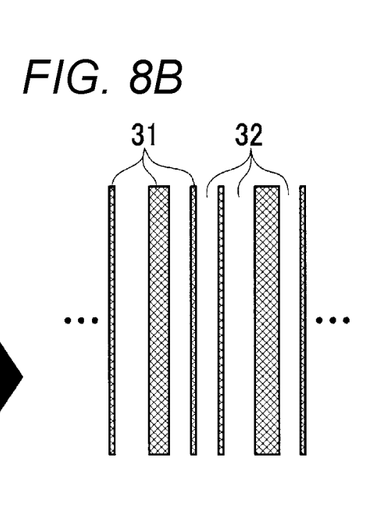
Figure 8C:
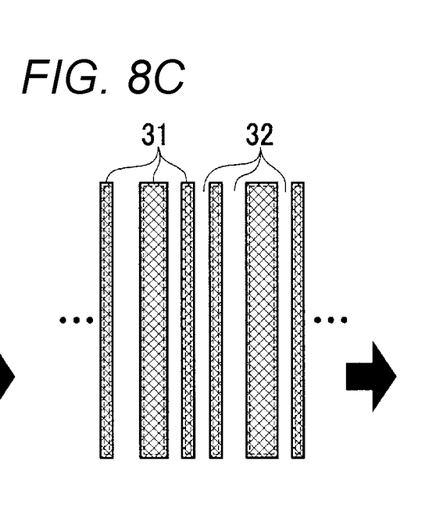
Figure 8D:
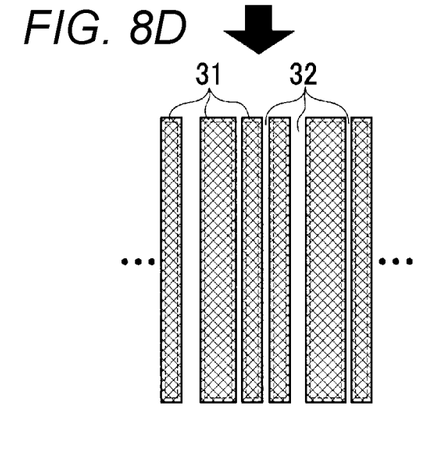

With respect to the ink smudge correction, lines that configure a barcode are exemplified. FIG. 8A shows a portion of a barcode image 30 before correction. FIG. 8B shows a portion of the barcode image 30 after the correction. FIG. 8C shows a portion of the barcode image 30 printed based on the barcode image 30 after the correction. FIG. 8D shows a portion of the barcode image 30 printed based on the uncorrected barcode image 30. As shown in FIGS. 8A to 8D, if the barcode image 30 is printed as it is without correction, black bars 31 become thick due to the smudge of the ink, and thus printing is performed so that the widths thereof are thicker than the desired black bars 31 of the barcode image 30 (FIG. 8A→FIG. 8D). Meanwhile, by the ink smudge correction, in the contours of the black bars 31 that configure the barcode image 30, if pixels in an amount corresponding to the set dot cutting amount are converted into the white color, both ends of the black bars 31 in the width direction are removed by the amount corresponding to the set dot cutting amount. As a result, the black bars 31 become thin, and thus white bars 32 become thick (FIG. 8A→FIG. 8B). Also, the corrected barcode image 30 is printed, the thinned black bars 31 become thicker due to the smudge of the ink (FIG. 8B→FIG. 8C). As a result, the width of the printed barcode image 30 becomes close to the width of the black bars 31 of the barcode image 30 before correction, so that it is more likely to obtain the desired barcode image 30.

According to the present illustrative embodiment, as a test pattern for setting the dot cutting amount that is the correction value for ink smudge correction, an ink smudge correction pattern image 262B including white bars 262D having different widths between black bars 262C having predetermined widths as shown in the test pattern image area 262A of FIG. 7A. Numbers respectively corresponding to the dot cutting amounts are attached to the black bars 262C. The number corresponds to the width of the white bar 262D, and the number=the number of dots of the width of the white bar 262D/2 (i.e., the number equals the number of dots of the width of the white bar 262D over two) is satisfied. That is, the width of the white bar 262D of Number 1 is two dots, and the width of the white bar 262D of Number 2 is four dots. Number 0 is a solid black bar without printing the white bar 262D. A printed matter of the ink smudge correction pattern image 262B is shown to the user, so that the largest number among the black bars 262C between which the white bars 262D are not seen is input. That is, due to the smudge of the ink, the black bars 262C is widened, and the white bars 262D are narrowed down. Therefore, the number in which the white bar 262D is broken down and disappeared corresponds to the smudge amount of the ink, and thus the number is input as the dot cutting amount.

According to the present illustrative embodiment, the number printed as a test pattern is displayed as an option in a smudge correction value selection list 262 in advance, and the user selects a number from the list. The correction value for ink smudge correction which is the dot cutting amount is an example of the first correction value. In addition, the set dot cutting amount may be the number of dots to be removed or may be a value indicating a standard amount for removal (for example, the number of dots to be removed is the input value×a predetermined number of dots (i.e., the input value multiplied by a predetermined number of dots)).

The conveyance error correction is correction for reducing the positional displacement of the ink by the conveyance error of the paper. The label printer 3 skew due to the slipping of the paper when the paper is conveyed. In the label printer 3, a printing nozzle of black ink and a printing nozzle of cyan ink are arranged to be spaced in the conveyance direction of the paper, and thus when skewing occurs, even if printing is performed with printing nozzles at the same position in the width direction, displacement by a skewing amount occurs at the application position of the ink. This skewing amount differs depending on the paper quality. Therefore, in the conveyance error correction, the label printer 3 receives the setting of the conveyance adjustment amount as the correction value and adjusts an ink ejection position based on the set conveyance adjustment amount.

According to the present illustrative embodiment, as the test pattern for inputting the correction value for conveyance error correction, as shown in the test pattern image area 263A of FIG. 7A, a conveyance error correction pattern image 263B including a plurality of bar set images 263C each of which is configured with a black bar having a predetermined width and a cyan bar having the same width and length as the black bar is printed. Numbers corresponding to the conveyance adjustment amounts are assigned to the bar set images 263C, respectively. The bar set images 263C are images in which positions of the cyan bars with respect to the black bars are different. In Number +1, the cyan bar is positioned on the left by one dot. In Number +2, the cyan bar is positioned on the left by two dots. In Number −1, the cyan bar is positioned on the right by one dot. In Number −2, the cyan bar is positioned on the right by two dots. In Number 0, the cyan bar is at the same position as the black bar. A printed matter of the conveyance error correction pattern image 263B is shown to the user, and a number in which a black bar and a cyan bar are overlapped with each other is input. That is, when the paper skews, even if the black ink and the cyan ink are ejected from the printing nozzles at the same position in the width direction, the ink is not applied to the same position, and displacement in the width direction may occur. For example, if skewing does not occur, the bar set of Number 0 is an image in which the both bars are overlapped with each other. However, if there is skewing by one dot to the left during conveyance from the printing nozzle of the black ink to the printing nozzle of the cyan ink, the both bars are not overlapped with each other in the bar set image 263C of Number 0, and the both bars are overlapped with each other in the bar set image 263C of Number +1. In this manner, the number in which the black bar and the cyan bar are overlapped with each other corresponds to the skewing amount, and thus the number is input as the conveyance adjustment amount.

According to the present illustrative embodiment, the numbers printed as the test patterns are displayed as the options in the conveyance error correction value selection list 263 in advance, and the user selects a number from the list. The correction value for conveyance error correction, which is the conveyance adjustment amount is an example of a second correction value. The set conveyance adjustment amount may be the number of dots to be adjusted or may be a value indicating a standard amount for adjustment (for example, the number of dots to be adjusted is the input value×a predetermined number of dots (i.e., the input value multiplied by a predetermined number of dots)).

In the correction value setting screen 260, a correction name is input to the correction name field 265. As described above, since the correction value differs depending on the paper quality, a name that can distinguish a paper quality or a model number of the paper may be input to the correction name.

Figure 7B:
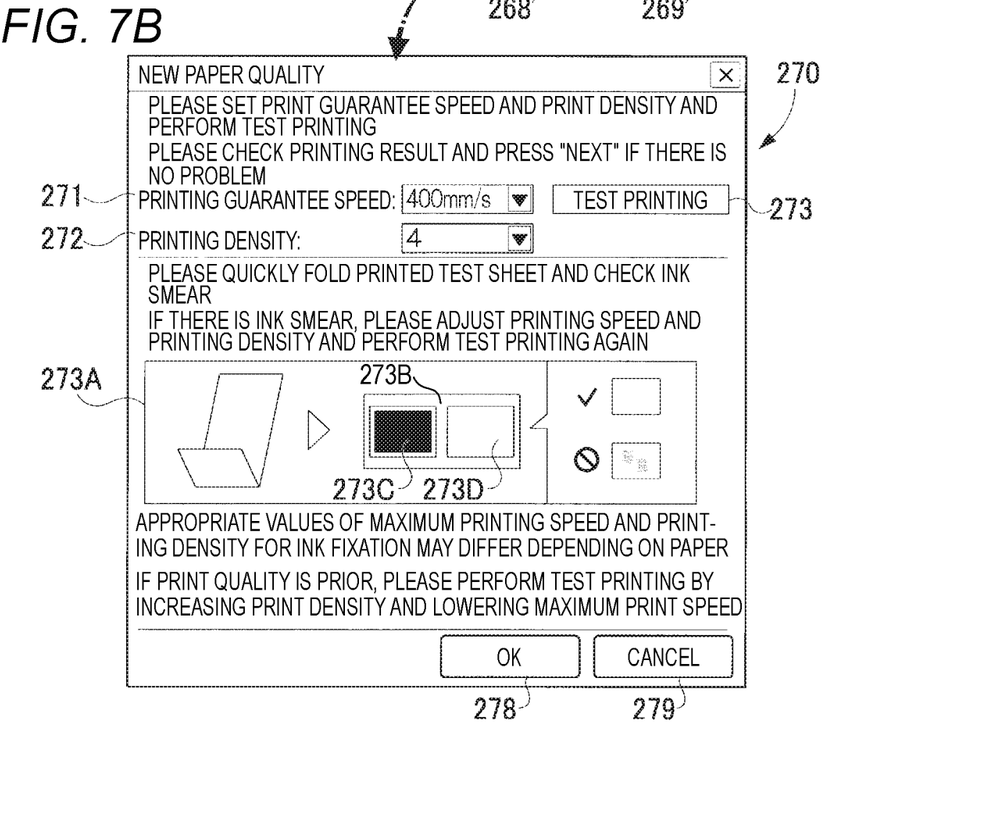

In the correction value setting screen 260, if the next button 268 is operated, the paper setting tool 24 closes the correction value setting screen 260, and a fixing confirmation setting screen 270 as shown in FIG. 7B is displayed on the user IF 13. In this stage, the setting of the correction value pre-set data is not completed and is not registered or updated to the correction value information table 26. Meanwhile, when the cancel button 269 is operated, the paper setting tool 24 closes the correction value setting screen 260 without registration or update to the correction value information table 26.

In the fixing confirmation setting screen 270, a setting of the correction value appropriate for fixing the coloring material is received. Specifically, a speed selection list 271 that is a list box for selecting the print guarantee speed, a concentration selection list 272 that is a list box for selecting the print density, a test print button 273 for receiving the printing instruction of the test pattern, an OK button 278, and a cancel button 279 are included in the fixing confirmation setting screen 270. In addition, a test pattern image area 273A showing a fixation adjustment test pattern image is included in the fixing confirmation setting screen 270.

In the fixing confirmation setting screen 270, when the test print button 273 is operated, the paper setting tool 24 instructs the label printer 3 to print a test pattern for fixing confirmation. According to the present illustrative embodiment, the test pattern printed based on the operation to the test print button 273 prints a fixing confirmation pattern image 273B in which a half of the label is a solid black image 273C, and the other half is a solid white image 273D as shown in the test pattern image area 273A of FIG. 7B. This fixing confirmation pattern image 273B is printed at the print guarantee speed selected from the speed selection list 271 and the print density selected from the concentration selection list 272. The user folds the label of the printed matter so that the both images of the solid black image 273C and the solid white image 273D are on the inside. Then, the user visually confirms whether the black ink is attached to the area of the solid white image 273D. With respect to the maximum printing speed and the print density, appropriate values for fixing the ink differs depending on the paper quality, and thus the user repeats the test printing to determine a preferable combination of the print guarantee speed and the print density. The print guarantee speed or print density is an example of the second correction value.

In the fixing confirmation setting screen 270, when the OK button 278 is operated, if the new button 255B is operated so that the correction value setting screen 260 is displayed, the paper setting tool 24 newly generates the correction value pre-set data of the set content, registers the generated correction value pre-set data to the correction value information table 26, and closes the fixing confirmation setting screen 270. If the edit button 255C is operated so that the correction value setting screen 260 is displayed, the paper setting tool 24 updates the correction value pre-set data selected from the correction value pre-set data registered to the correction value information table 26 to the set content and closes the fixing confirmation setting screen 270. Meanwhile, when the cancel button 279 is operated, the paper setting tool 24 closes the fixing confirmation setting screen 270 without registration or update to the correction value information table 26.

The correction value that configures the correction value pre-set data is roughly classified into a correction value relating to image processing and a correction value relating to printer control. The correction value relating to the image processing is used for generating the print data by the printer driver 23. The dot cutting amount of the ink smudge correction corresponds to the correction value relating to the image processing. The correction value relating to the control of the printer is used when the image shown in the print data is printed by the label printer 3. The conveyance adjustment amount of the conveyance error control, the print guarantee speed, and the print density correspond to the correction value relating to the control of the printer.

{Printing Procedure of Printing System}

Figure 9:
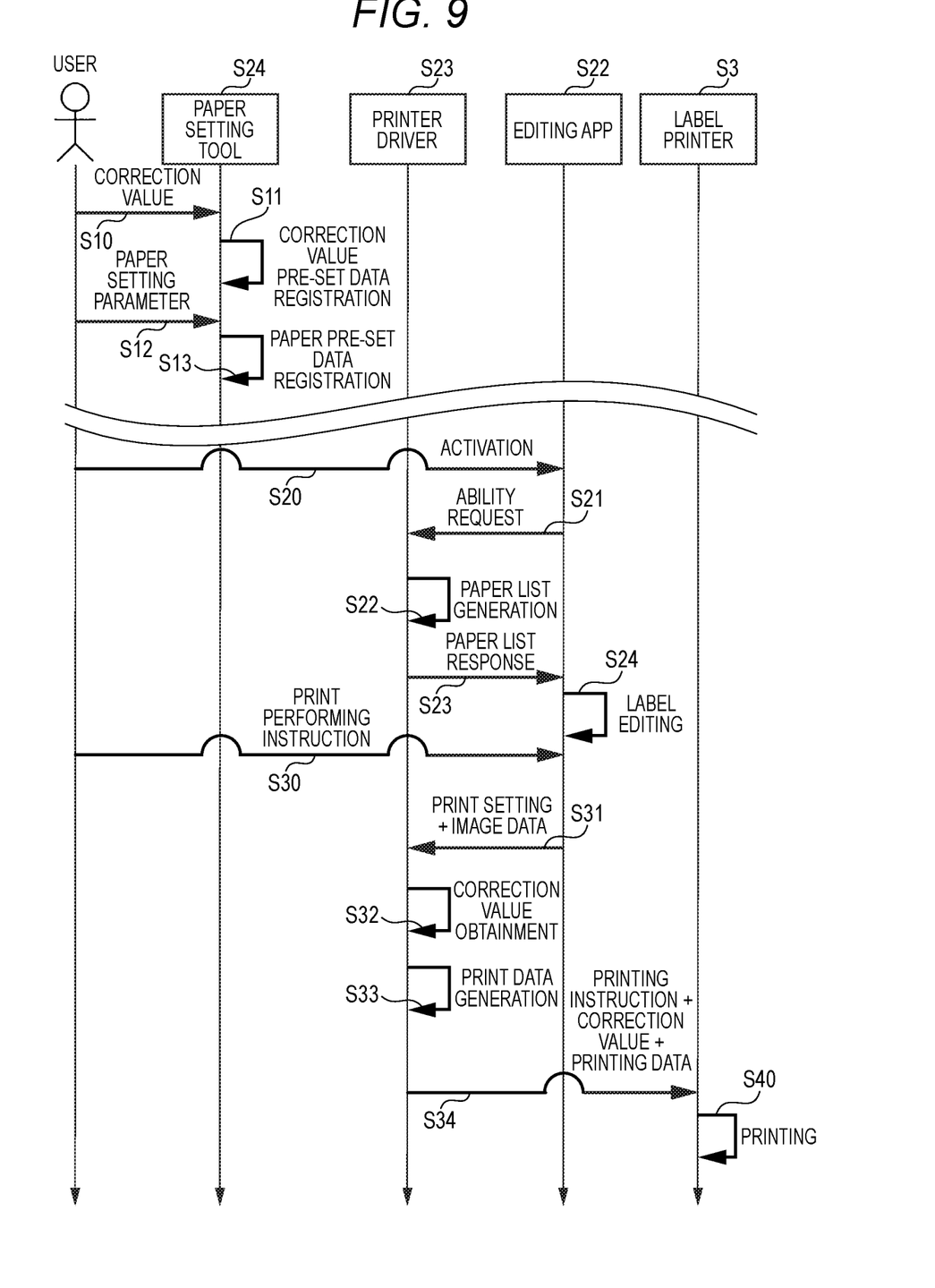
FIG. 9 is a sequence diagram showing a printing procedure of a printing system according to the illustrative embodiment.

Next, the printing procedure in the printing system 100 is described with reference to the sequence diagram of FIG. 9. Process steps of the editing app 22, the printer driver 23, and the paper setting tool 24 described below basically show processes of the CPU 11 according to commands described in each program. That is, processes such as "decision", "extraction", "selection", "calculation", "determination", "specifying", "obtaining", "reception", and "control" described below show the processes of the CPU 11. The processes by the CPU 11 include hardware control by API of the OS 21 of the PC 1. In the present disclosure, operations of the programs are described without the description of the OS 21.

In the printing system 100 according to the present illustrative embodiment, when a label is generated by the label printer 3, that is, when printing is performed by the label printer 3, it is required to register the paper pre-set data and the correction value pre-set data in advance by using the paper setting tool 24. Therefore, the user first operates the user IF 13 of the PC 1 and activates the paper setting tool 24. The activated paper setting tool 24 displays the basic screen 240 shown in FIG. 6A. According to the operation by the user, the paper setting screen 250 shown in FIG. 7A is displayed from the basic screen 240, and the correction value setting screen 260 shown in FIG. 7B is further displayed from the paper setting screen 250.

The paper setting tool 24 receives inputs of various correction values via the correction value setting screen 260 and the fixing confirmation setting screen 270 (Process Step 10, hereinafter, the "process step" is referred to as "S"). After the inputs of the various correction values are received, the paper setting tool 24 generates the correction value pre-set data in association with the various input correction values and registers the generated correction value pre-set data to the correction value information table 26 (S11). Since the appropriate correction value differs depending on the paper quality, a plurality of items of the correction value pre-set data may be registered in advance. The correction value pre-set data of the default values with which default values of the correction values are associated may be registered to the correction value information table 26 in advance, and the registration of the correction value pre-set data based on the user operation may be omitted when the only correction value pre-set data of the default values is used.

The paper setting tool 24 receives inputs of various parameters showing characteristics of the paper via the paper setting screen 250. After inputs of various parameters are received (S12), the paper setting tool 24 generates paper pre-set data associated with the input parameter and registers the generated paper pre-set data to the paper information table 25 (S13). A plurality of items of the paper pre-set data may be also registered in advance. Thereafter, the editing app 22 is activated by the user (S20). The editing app 22 requests the printer driver 23 for information showing the ability of the label printer 3 at the time of activation (S21).

The printer driver 23 refers to the paper information table 25 in response to the ability request from the editing app 22, obtains paper names of respective items of the paper pre-set data registered in the paper information table 25, and generates a list of the obtained paper names (S22). Then, the printer driver 23 responds to the editing app 22 with the generated list (S23). The printer driver 23 obtains the various kinds of ability information from the label printer 3 in response to the ability request from the editing app 22 and responds also with the ability information directly obtained from the label printer 3 in S23. Specifically, in S23, the printer driver 23 responds to the editing app 22 with a list generated by causing the paper names included in the list to be included in the items of the paper sizes included in the ability information.

After receiving a response from the printer driver 23, the editing app 22 displays the main screen 220 shown in FIG. 4 and receives the editing of the label (S24). In S24, as the print setting, selection of the paper name is received, and a paper name is selected based on an operation from the user. Also in S24, the paper setting tool 24 may be activated by receiving an activation instruction of the paper setting tool 24. That is, also in S24, new paper pre-set data or new correction value pre-set data may be added.

The editing app 22 may request transfer of the paper pre-set data corresponding to the selected paper name from the printer driver 23. In this case, the printer driver 23 reads the paper pre-set data corresponding to the selected paper name from the paper information table 25 and responds to the editing app 22. The editing app 22 to which the paper pre-set data is received may change setting contents of the height setting area 223, the margin setting area 224, or the orientation setting area 225 based on the paper pre-set data.

Thereafter, the editing app 22 receives an input of the printing instruction by the operation from the user (S30).

When the editing app 22 receives the printing instruction from the user, the editing app 22 sends the print setting received in S24 and the image data showing the image to be printed to the printer driver 23 (S31). The selected paper name is included in the print setting.

When the print setting and the image data are received, the printer driver 23 obtains the correction value based on the print setting (S32). Specifically, the printer driver 23 reads the paper pre-set data corresponding to the paper name included in the print setting from the paper information table 25 and reads the correction value pre-set data corresponding to the correction name included in the read paper pre-set data from the correction value information table 26. Accordingly, the printer driver 23 obtains various correction values included in the correction value pre-set data. In this manner, according to the present illustrative embodiment, since the correction name is included in the paper pre-set data, the correction value is automatically selected for the printer driver 23 by the selection of the paper name in the editing app 22 by the user.

After S32, the printer driver 23 generates print data corrected based on the correction value relating to image processing among the plurality of obtained correction values (S33). In S33, for example, the print data for the ink smudge correction is generated by using the dot cutting amount. The correction value relating to the image processing other than the dot cutting amount may be included in the correction value pre-set data. For example, when a correction value such as brightness, contrast, or color balance is included, the color balance may be corrected according to the correction values. In S33, the image data may be corrected, and the print data may be corrected. That is, print data may be first generated before the correction, print data may be generated after the correction, or correction and generation of the print data may be performed at the same time. The image to be corrected may be only a specific image such as an image showing a barcode among printing targets and may be the entire images. In addition, an object to be corrected may be a text object or a line object or may be all objects.

After S33, the printer driver 23 transmits a printing instruction in which the print data and the correction value relating to the control of the printer among the plurality of obtained correction values are associated with each other, to the label printer 3 (S34).

The label printer 3 that receives the printing instruction prints the image based on the received print data according to the received correction value (S40). In S40, for example, a print position is adjusted according to the conveyance adjustment amount. The paper is conveyed according to the print guarantee speed. The ink ejection amount is adjusted according to the print density. Accordingly, an image to which various correction values are reflected is printed by the label printer 3.

As specifically described above, in the printing system 100 according to the present illustrative embodiment, paper pre-set data in which a correction name showing one item of correction value pre-set data including a plurality of correction values and a plurality of parameters showing characteristics of paper are associated with each other is prepared by the paper setting tool 24 in advance and is registered to the paper information table 25. Also, a list of the paper names in the paper pre-set data prepared in advance is sent to the editing app 22 by the printer driver 23. The editing app 22 receives the selection of the paper name included in the list as an item of print setting. When the print setting including the paper name is received from the editing app 22, the printer driver 23 refers to the paper information table 25 and obtains the correction value pre-set data associated with the paper name. Accordingly, when the user sets one paper name via the editing app 22, various correction values are obtained along with the setting. Therefore, a labor of changing various correction values when a parameter relating to the paper is changed can be reduced.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

For example, the information process device that configures the printing system 100 may be an information process device that can communicate with the printer, is not limited to a PC, and may be a PDA or a smart phone. The printer that configures the printing system 100 may be a device having a printing function, is not limited to a label printer, and may be a printer that prints on cut paper, a copying machine or a multi-function printer. In addition, in case of a label, the surface thereof may be specially processed (laminated or polished), and thus a plurality of kinds of correction based on the difference in surface roughness for each label may be required. Therefore, a configuration for printing on the label printer 3 as described in the present disclosure is preferable.

The non-transitory computer-readable medium may be configured by a plurality of memories, and the first program and the second program may be stored in respective memories. For example, the memory 12 may be configured by a first memory and a second memory, and the paper setting tool 24 (one example of the first program) may be stored in the first memory and the printer driver 23 (one example of the second program) may be stored in the second memory.

In addition, according to the illustrative embodiment, the printer driver 23 and the paper setting tool 24 are configured with different programs, but may be configured with one program. For example, the printer driver 23 may have a function of generating the paper pre-set data or the correction value pre-set data.

According to the illustrative embodiment, the paper information table 25 and the correction value information table 26 are stored in the PC 1, but a device for storing these tables is not limited to the PC 1. For example, the tables may be stored in a device different from the PC 1 such as a server and may be stored in the label printer 3. Also, a configuration in which a storage destination of the tables is stored in the printer driver 23, so that the tables are referred to from a device as the storage destination.

In addition, according to the illustrative embodiment, as the paper pre-set data, the paper information indicating the characteristics of the paper and the correction value are associated with each other, but types of coloring materials or environmental values (temperature and humidity) may be further associated. That is, the appropriate value of the correction value may differ depending on the types of coloring materials and the environmental values, and thus, by associating the correction value with this information, for example, a paper name can be selected depending on the type of the coloring materials or the environmental value, so that more appropriate correction values can be simply substituted.

According to the illustrative embodiment, the timing when the printer driver 23 refers to the paper information table 25 is the time of the request from the editing app 22 when the editing app 22 is activated, but, for example, may be a request from the editing app 22 when the editing app 22 receives an input of the print setting, may be a timing when the printer driver 23 is activated, and may be a timing when the print setting screen that the printer driver 23 has is displayed.

According to the illustrative embodiment, the correction value pre-set data obtained by collecting a plurality of correction values is prepared and is stored in a table different from the paper pre-set data, but the plurality of correction values may be included in the paper pre-set data. Here, as in the illustrative embodiment, by storing the correction value pre-set data obtained by collecting the plurality of correction values and causing the user to select the correction value pre-set data, the plurality of correction values can be collectively set in the paper pre-set data. Accordingly, a labor of setting the correction values when the paper pre-set data is registered can be reduced.

In any flowchart described in the illustrative embodiment, a plurality of processes in a plurality of steps can be freely changed in the execution order or can be executed in parallel as long as the processing contents do not conflict with each other.

The processes described in the illustrative embodiment may be executed by a single CPU, a plurality of CPUs, hardware such as an ASIC, or a combination thereof. The processes described in the illustrative embodiment can be realized in various aspects such as a recording medium or a method in which a program for executing the process is recorded.

What is claimed is:

1. A non-transitory computer-readable medium storing program set comprising a first program and a second program readable by a computer of an information processing device,
    the first program, when executed by the computer, causing the information process device to perform:
        registering paper pre-set data to a paper information table stored in the information process device, a first correction value that is used for correcting image data and paper information showing characteristics of paper being associated with each other in the paper information table, a plurality of items of the paper pre-set data being registerable to the paper information table, and
    the second program, when executed by the computer, causing the information process device to perform:
        generating a list showing the paper pre-set data registered in the paper information table;
        based on receiving a request from an application program installed in the information process device, sending the generated list to the application program, the application program being configured to set one item of the paper pre-set data included in the list as a paper parameter relating to paper among parameters included in print setting;
        based on receiving, from the application program, image data and the print setting in which one item of the paper pre-set data included in the list is set as the paper parameter, obtaining the first correction value corresponding to the paper pre-set data set in the received print setting from the paper information table;
        correcting the received image data received from the application program by using the obtained first correction value; and
        transmitting a printing command to a printer via a communication interface of the information process device, the printing command being for performing printing based on the corrected image data.

2. The non-transitory computer-readable medium according to claim 1, wherein in the correcting of the image data, the second program causes the information process device to perform:
    correcting the image data by thinning widths of lines included in an image shown in the received image data received from the application program based on the obtained first correction value.

3. The non-transitory computer-readable medium according to claim 2, wherein in the correcting of the image data, the second program causes the information processing device to perform:
    in a case an image showing a barcode is included in the received image data received from the application program, correcting the image data by removing both ends of black lines that configure the barcode in a width direction by the number of dots based on the obtained first correction value.

4. The non-transitory computer-readable medium according to claim 1, wherein in the registering of the paper pre-set data, the first program causes the information processing device to perform:
    receiving an input of the first correction value via a user interface of the information process device; and
    registering the paper pre-set data to the paper information table stored in the information process device, the input first correction value and the paper information being associated with each other in the paper information table.

5. The non-transitory computer-readable medium according to claim 1,
    wherein in the registering of the paper pre-set data, the first program causes the information processing device to perform:
        registering the paper pre-set data to the paper information table stored in the information process device, the first correction value, a second correction value that is a correction value different from the first correction value, and the paper information being associated with each other in the paper information table,
    wherein in the obtaining of the first correction value, the second program causes the information processing device to perform:
        based on receiving, from the application program, the image data and the print setting in which one item of the paper pre-set data included in the list is set as the paper parameter, obtaining the first correction value and the second correction value that correspond to the paper pre-set data set to the received print setting from paper information table, and
    wherein in the correcting of the image data, the second program causes the information processing device to perform:

correcting the received image data received from the application program by using the obtained first correction value and the obtained second correction value.

6. The non-transitory computer-readable medium according to claim 1,
wherein in the registering of the paper pre-set data, the first program causes the information processing device to perform:
registering the paper pre-set data to the paper information table stored in the information process device, the first correction value, a second correction value that is a correction value different from the first correction value, and the paper information being associated with each other in the paper information table,
wherein in the obtaining of the first correction value, the second program causes the information processing device to perform:
based on receiving, from the application program, the image data and the print setting in which one item of the paper pre-set data included in the list is set as the paper parameter, obtaining the first correction value and the second correction value that correspond to the paper pre-set data set to the received print setting from the paper information table, and
wherein in the transmitting of the printing command, the second program causes the information processing device to perform:
transmitting the printing command to the printer via the communication interface of the information process device, the printing command being for performing printing based on the image data corrected by using the obtained second correction value.

7. The non-transitory computer-readable medium according to claim 5,
wherein the first program, when executed by the computer, further causes the information process device to perform:
registering correction value pre-set data to a correction value information table stored in the information process device, the first correction value and the second correction value being associated with each other in the correction value information table, a plurality of items of the correction value pre-set data being registerable to the correction value information table, and
wherein in the registering of the paper pre-set data, the first program causes the information process device to perform:
receiving, via a user interface of the information process device, selection of one item of the correction value pre-set data registered in the correction value information table; and
registering the paper pre-set data to the paper information table stored in the information process device, the first correction value and the second correction value that correspond to the selected correction value pre-set data and the paper information being associated with each other in the paper information table.

8. The non-transitory computer-readable medium according to claim 6,
wherein the first program, when executed by the computer, further causes the information process device to perform:
registering correction value pre-set data to a correction value information table stored in the information process device, the first correction value and the second correction value being associated with each other in the correction value information table, a plurality of items of the correction value pre-set data being registerable to the correction value information table, and
wherein in the registering of the paper pre-set data, the first program causes the information process device to perform:
receiving, via a user interface of the information process device, selection of one item of the correction value pre-set data registered in the correction value information table; and
registering the paper pre-set data to the paper information table stored in the information process device, the first correction value and the second correction value that correspond to the selected correction value pre-set data and the paper information being associated with each other in the paper information table.

9. The non-transitory computer-readable medium according to claim 1,
wherein the printer is a label printer,
wherein a characteristic of paper shown in the paper information are a characteristic relating to a paper quality of a label, and
wherein in the transmitting of the printing command, the second program causes the information process device to perform:
transmitting the printing command to the label printer via the communication interface of the information process device, the printing command being for performing printing based on the corrected image data.

10. A non-transitory computer-readable medium storing a computer program readable by a computer of an information process device, the computer program, when executed by the computer, causing the information process device to perform:
generating a list showing paper pre-set data registered in a paper information table stored in the information process device, a first correction value that is used for correcting image data and paper information showing characteristics of paper being associated with each other in the paper pre-set data, a plurality of items of the paper pre-set data being registerable to the paper information table;
based on receiving a request from an application program installed in the information process device, sending the generated list to the application program, the application program being configured to set one item of the paper pre-set data included in the list as a paper parameter relating to paper among parameters included in print setting;
based on receiving, from the application program, the image data and the print setting to which one item of the paper pre-set data included in the list as the paper parameter is set, obtaining the first correction value corresponding to the paper pre-set data set to the received print setting from the paper information table;
correcting the received image data received from the application program by using the obtained first correction value; and
transmitting a printing command to a printer via a communication interface of the information process device, the printing command being for performing printing based on the corrected image data.

11. The non-transitory computer-readable medium according to claim 10, wherein in the correcting of the image data, the computer program causes the information process device to perform:
 correcting the image data by thinning widths of lines included in an image shown in the received image data received from the application program based on the obtained first correction value.

12. The non-transitory computer-readable medium according to claim 11, wherein in the correcting of the image data, the computer program causes the information processing device to perform:
 in a case an image showing a barcode is included in the received image data received from the application program, correcting the image data by removing both ends of black lines that configure the barcode in a width direction by the number of dots based on the obtained first correction value.

13. The non-transitory computer-readable medium according to claim 10, wherein in the registering of the paper pre-set data, the computer program causes the information processing device to perform:
 receiving an input of the first correction value via a user interface of the information process device; and
 registering the paper pre-set data to the paper information table stored in the information process device, the input first correction value and the paper information being associated with each other in the paper information table.

14. The non-transitory computer-readable medium according to claim 10, wherein the computer program causes the information device to perform:
 in the registering of the paper pre-set data, registering the paper pre-set data to the paper information table stored in the information process device, the first correction value, a second correction value that is a correction value different from the first correction value, and the paper information being associated with each other in the paper information table;
 in the obtaining of the first correction value, based on receiving, from the application program, the image data and the print setting in which one item of the paper pre-set data included in the list is set as the paper parameter, obtaining the first correction value and the second correction value that correspond to the paper pre-set data set to the received print setting from paper information table; and
 in the correcting of the image data, correcting the received image data received from the application program by using the obtained first correction value and the obtained second correction value.

15. The non-transitory computer-readable medium according to claim 10, wherein the computer program causes the information device to perform:
 in the registering of the paper pre-set data, registering the paper pre-set data to the paper information table stored in the information process device, the first correction value, a second correction value that is a correction value different from the first correction value, and the paper information being associated with each other in the paper information table;
 in the obtaining of the first correction value, based on receiving, from the application program, the image data and the print setting in which one item of the paper pre-set data included in the list is set as the paper parameter, obtaining the first correction value and the second correction value that correspond to the paper pre-set data set to the received print setting from the paper information table; and
 in the transmitting of the printing command, transmitting the printing command to the printer via the communication interface of the information process device, the printing command being for performing printing based on the image data corrected by using the obtained second correction value.

16. The non-transitory computer-readable medium according to claim 14,
 wherein the computer program, when executed by the computer, further causes the information process device to perform:
  registering correction value pre-set data to a correction value information table stored in the information process device, the first correction value and the second correction value being associated with each other in the correction value information table, a plurality of items of the correction value pre-set data being registerable to the correction value information table, and
 wherein in the registering of the paper pre-set data, the computer program causes the information process device to perform:
  receiving, via a user interface of the information process device, selection of one item of the correction value pre-set data registered in the correction value information table; and
  registering the paper pre-set data to the paper information table stored in the information process device, the first correction value and the second correction value that correspond to the selected correction value pre-set data and the paper information being associated with each other in the paper information table.

17. The non-transitory computer-readable medium according to claim 15,
 wherein the computer program, when executed by the computer, further causes the information process device to perform:
  registering correction value pre-set data to a correction value information table stored in the information process device, the first correction value and the second correction value being associated with each other in the correction value information table, a plurality of items of the correction value pre-set data being registerable to the correction value information table, and
 wherein in the registering of the paper pre-set data, the program causes the information process device to perform:
  receiving, via a user interface of the information process device, selection of one item of the correction value pre-set data registered in the correction value information table; and
  registering the paper pre-set data to the paper information table stored in the information process device, the first correction value and the second correction value that correspond to the selected correction value pre-set data and the paper information being associated with each other in the paper information table.

18. The non-transitory computer-readable medium according to claim 10,
 wherein the printer is a label printer,
 wherein a characteristic of paper shown in the paper information are a characteristic relating to a paper quality of a label, and wherein in the transmitting of the printing command, the computer program causes the information process device to perform:
transmitting the printing command to the label printer via the communication interface of the information process device, the printing command being for performing printing based on the corrected image data.

19. A control method for an information process device connectable to a printer having a printing function, the control method comprising:

generating a list showing paper pre-set data registered in a paper information table stored in the information process device, a first correction value that is used for correcting image data and paper information showing characteristics of paper being associated with each other in the paper pre-set data, a plurality of items of the paper pre-set data being registerable to the paper information table;

based on receiving a request from an application program installed in the information process device, sending the generated list to the application program, the application program being configured to set one item of the paper pre-set data included in the list as a paper parameter relating to paper among parameters included in print setting;

based on receiving, from the application program, the image data and the print setting to which one item of the paper pre-set data included in the list as the paper parameter is set, obtaining the first correction value corresponding to the paper pre-set data set to the received print setting from the paper information table;

correcting the received image data received from the application program by using the obtained first correction value; and transmitting a printing command to the printer via a communication interface of the information process device, the printing command being for performing printing based on the corrected image data.

* * * * *